United States Patent
Pearce et al.

(10) Patent No.: US 8,442,037 B2
(45) Date of Patent: May 14, 2013

(54) SYSTEM AND METHOD FOR DEVICE REGISTRATION REPLICATION IN A COMMUNICATION NETWORK

(75) Inventors: Christopher E. Pearce, Dallas, TX (US); Clint D. Entrop, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 12/782,297

(22) Filed: May 18, 2010

(65) Prior Publication Data
US 2010/0226364 A1   Sep. 9, 2010

Related U.S. Application Data

(62) Division of application No. 09/579,348, filed on May 25, 2000, now Pat. No. 7,733,845.

(51) Int. Cl.
   *H04L 12/66* (2006.01)
   *H04L 12/28* (2006.01)
   *G01R 31/08* (2006.01)
   *H04M 11/00* (2006.01)

(52) U.S. Cl.
   USPC ......... 370/352; 370/401; 370/216; 379/93.01

(58) Field of Classification Search .................. 370/260, 370/262, 270, 351, 352–356, 400, 401, 410, 370/412, 413, 389, 392; 379/93.09, 93.27, 379/201.01, 272, 279, 9, 10, 134, 221.02, 379/111, 112, 113, 115, 219–224; 709/238–240
See application file for complete search history.

(56) References Cited

U.S. PATENT DOCUMENTS

| | | | |
|---|---|---|---|
| 4,748,658 A | 5/1988 | Gopel et al. | |
| 4,757,267 A | 7/1988 | Riskin | |
| 4,797,915 A | 1/1989 | Bowker et al. | |
| 5,068,892 A | 11/1991 | Livanos | |
| 5,430,792 A | 7/1995 | Jesurum et al. | |
| 5,652,866 A | 7/1997 | Aldred et al. | |
| 5,790,647 A | 8/1998 | Gessel | |
| 5,867,494 A | 2/1999 | Krishnaswamy et al. | |
| 5,950,198 A | 9/1999 | Falls et al. | |
| 6,144,727 A | 11/2000 | Mashinsky | |
| 6,161,008 A | 12/2000 | Lee et al. | |
| 6,205,214 B1 | 3/2001 | Culli et al. | |
| 6,205,557 B1 * | 3/2001 | Chong et al. | 714/4.1 |
| 6,259,779 B1 | 7/2001 | Council et al. | |
| 6,275,574 B1 | 8/2001 | Oran | |
| 6,282,194 B1 | 8/2001 | Cheesman et al. | |

(Continued)

OTHER PUBLICATIONS

Cisco Systems, Inc.; "System Description for the Cisco Communications Network Version 2.1;" Cisco Communications Network; all, 1997.

*Primary Examiner* — Hanh N Nguyen
(74) *Attorney, Agent, or Firm* — Baker Botts L.L.P.

(57) ABSTRACT

A system for device registration replication in a packet-based network includes a first call manager and a second call manager that are coupled to the packet-based network. The first and second call managers each control one or more devices and store composite registration information associated with the devices. The first call manager communicates status information to the second call manager in response to a change in the control status of a device controlled by the first call manager. The second call manager updates the composite registration information stored by the second call manager in response to receiving status information from the first call manager.

25 Claims, 3 Drawing Sheets

U.S. PATENT DOCUMENTS

| | | | |
|---|---|---|---|
| 6,304,574 B1 | 10/2001 | Schoo et al. | |
| 6,304,576 B1 | 10/2001 | Corley et al. | |
| 6,353,610 B1 | 3/2002 | Bhattacharya et al. | |
| 6,363,065 B1 | 3/2002 | Thornton et al. | |
| 6,366,576 B1 | 4/2002 | Haga | |
| 6,389,130 B1 | 5/2002 | Shenoda et al. | |
| 6,498,791 B2 | 12/2002 | Pickett et al. | |
| 6,522,732 B1 | 2/2003 | Pullen et al. | |
| 6,560,326 B1 | 5/2003 | Clark | |
| 6,570,855 B1 * | 5/2003 | Kung et al. | 370/237 |
| 6,574,012 B1 | 6/2003 | Kagawa | |
| 6,584,093 B1 | 6/2003 | Salama et al. | |
| 6,597,687 B1 | 7/2003 | Rao | |
| 6,614,780 B2 | 9/2003 | Hakim et al. | |
| 6,614,902 B1 | 9/2003 | Rizzetto | |
| 6,657,989 B1 | 12/2003 | Hilsenrath | |
| 6,671,262 B1 | 12/2003 | Kung et al. | |
| 6,711,159 B1 | 3/2004 | Grabelsky et al. | |
| 6,718,482 B2 | 4/2004 | Sato et al. | |
| 6,751,459 B1 | 6/2004 | Lee et al. | |
| 6,760,324 B1 | 7/2004 | Scott et al. | |
| 6,760,416 B1 | 7/2004 | Banks et al. | |
| 6,785,223 B1 | 8/2004 | Korpi et al. | |
| 6,798,767 B1 | 9/2004 | Alexander et al. | |
| 6,925,076 B1 | 8/2005 | Dalgic et al. | |
| 7,359,368 B1 * | 4/2008 | Pearce | 370/352 |
| 7,636,349 B2 * | 12/2009 | Pearce et al. | 370/352 |
| 7,733,845 B1 * | 6/2010 | Pearce et al. | 370/352 |
| 2002/0150080 A1 | 10/2002 | Bhattacharya et al. | |

* cited by examiner

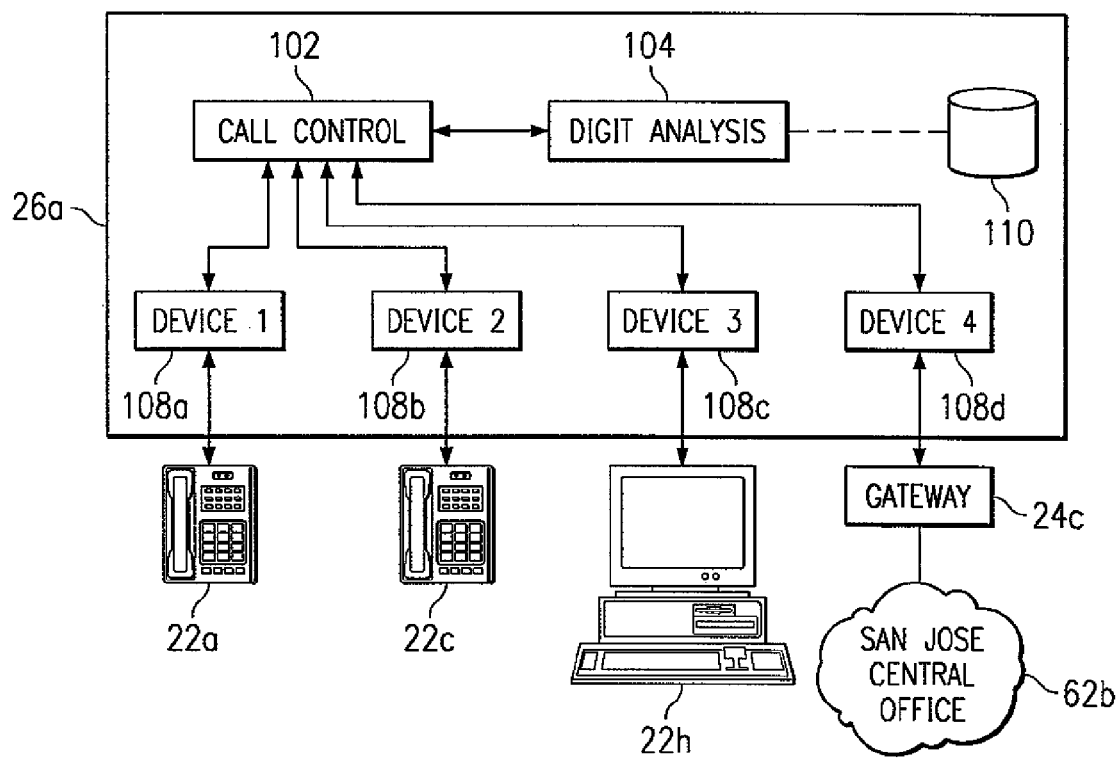

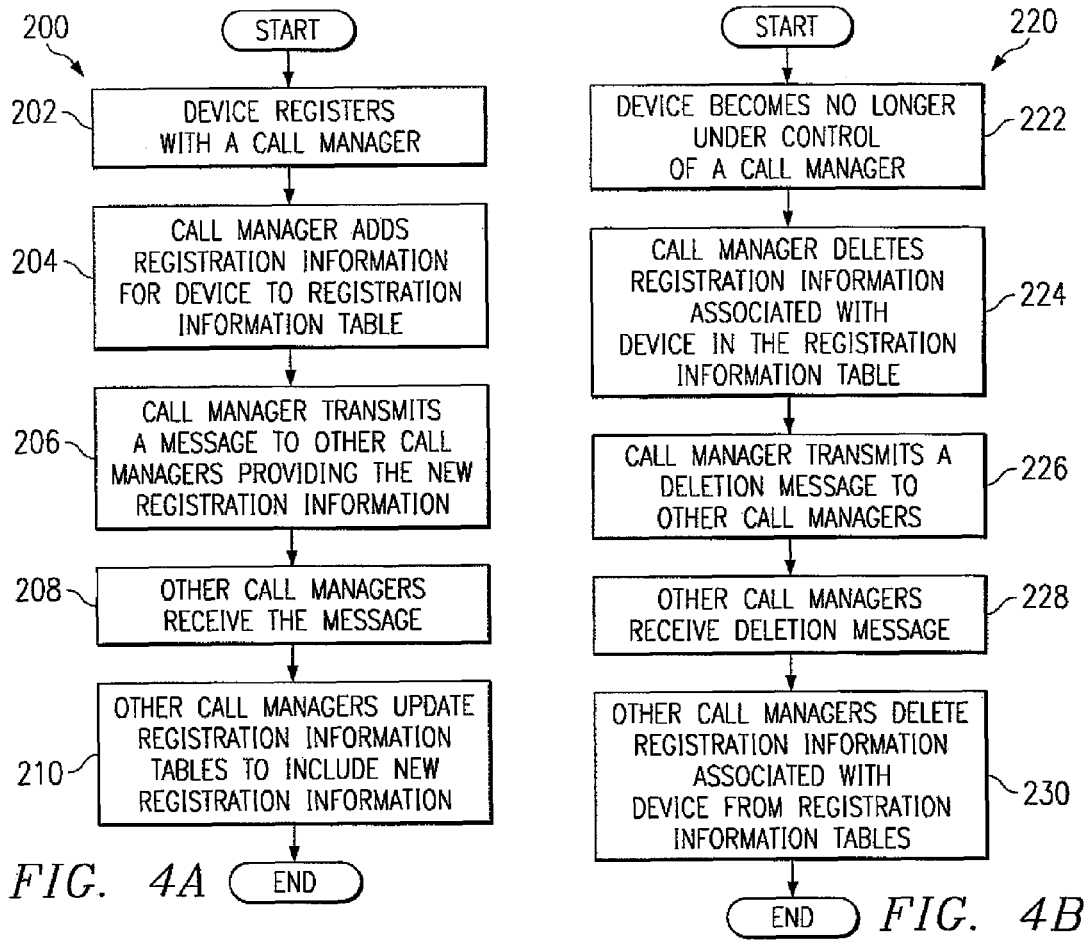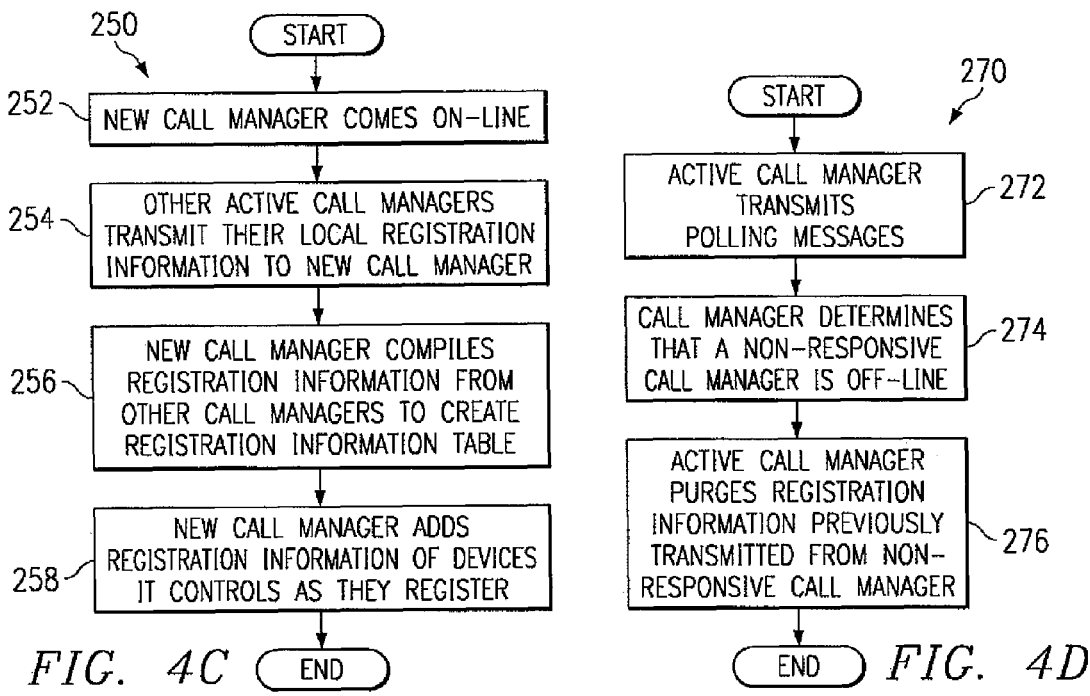

SYSTEM AND METHOD FOR DEVICE REGISTRATION REPLICATION IN A COMMUNICATION NETWORK

CROSS-REFERENCE TO RELATED APPLICATIONS

This application is a divisional of U.S. application Ser. No. 09/579,348 filed May 25, 2000 and entitled "System and Method for Device Registration Replication in a Communication Network".

This application is related to the following commonly-owned patents:
SYSTEM AND METHOD FOR ROUTING CALLS ACROSS CALL MANAGERS USING A ROUTE PLAN, U.S. Pat. No. 7,412,051, issued Aug. 12, 2008;
SYSTEM AND METHOD FOR PROVIDING SHARED LINE APPEARANCES IN A DISTRIBUTED CALL ROUTING, U.S. Pat. No. 7,145,899, issued Dec. 5, 2006;
SYSTEM AND METHOD FOR ROUTING CALLS USING DIALING PARTITIONS, U.S. Pat. No. 7,359,368, issued Apr. 15, 2008; and
SYSTEM AND METHOD FOR DISTRIBUTED CALL ROUTING, U.S. Pat. No. 6,847,634, issued Jan. 25, 2005.

TECHNICAL FIELD OF THE INVENTION

This invention relates generally to the field of telecommunications, and more specifically to a system and method for device registration replication in a communication network.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network.

SUMMARY OF THE INVENTION

In accordance with the present invention, a system and method for device registration replication in a communication network is provided that substantially eliminates or reduces disadvantages or problems associated with previously developed systems and methods. In particular, the present invention contemplates a system and method for replicating device registration information between multiple nodes in a communication network to provide access to the device from any of the nodes containing the device registration information.

In one embodiment of the present invention, a system for device registration replication in a packet-based network includes a first call manager and a second call manager that are coupled to the packet-based network. The first and second call managers each control one or more devices and store composite registration information associated with the devices. The first call manager communicates status information to the second call manager in response to a change in the control status of a device controlled by the first call manager. The second call manager updates the composite registration information stored by the second call manager in response to receiving status information from the first call manager.

In a more particular embodiment, the first call manager is also operable to determine that the second call manager has gone off-line and operable to delete registration information associated with the devices controlled by second call manager from the composite registration information stored by the first call manager. In another more particular embodiment, the first call manager is also operable to determine that the second call manager has come on-line and operable to communicate local registration information associated with devices controlled by the first call manager to the second call manager.

Technical advantages of the present invention include a system and method for device registration information replication that allows the control of a number of devices in a communication network to be distributed between a number of call managers. Each call manager knows the registration information associated with the devices the call manager controls, but this information must be distributed to the other call managers so that the other call managers may communicate with the devices. The present invention provides a system and method for replicating registration information between call managers that enable the distributed control of devices in a communication network.

By automatically replicating and/or deleting registration information when a device or call manager comes on-line or goes off-line, the present invention enables a dynamic communication network where devices can be controlled by any call manager and where devices can seamlessly move their registration between call managers (for example, when a call manager fails or reaches its capacity). Since device registration information is automatically updated between active call managers and sent to new call managers, the distribution of device control between the call managers can be dynamically changed without the intervention of a human administrator.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an exemplary call manager in accordance with one embodiment of the present invention;

FIG. 3 illustrates an exemplary registration information table maintained by a call manager in accordance with one embodiment of the present invention; and FIGS. 4A-4D illustrate exemplary procedures for updating registration information stored in a registration information table in accordance with one embodiment of the present invention.

DETAILED DESCRIPTION OF THE INVENTION

Figure 1:
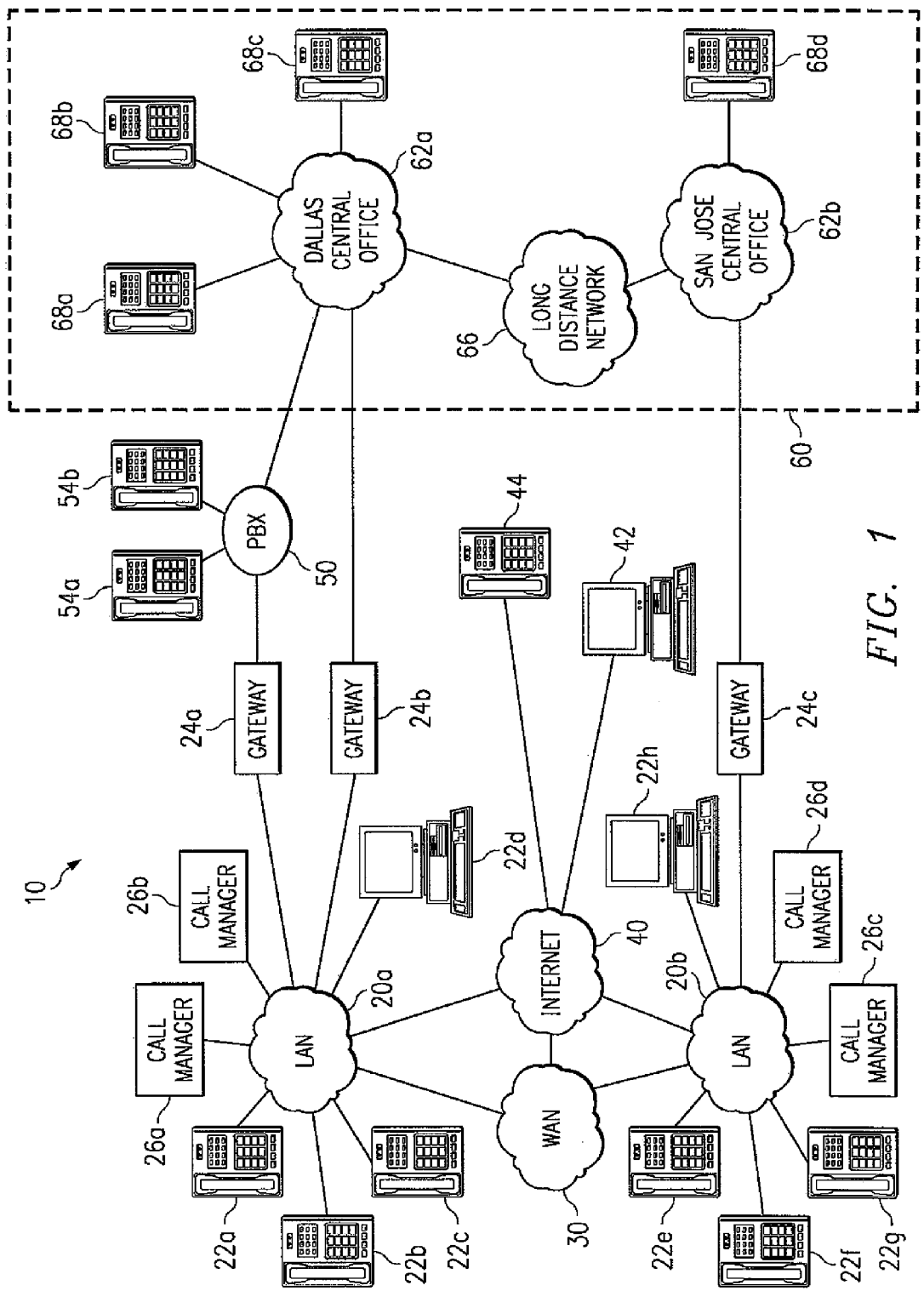
FIG. 1 illustrates an exemplary communication network in accordance with one embodiment of the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In a particular embodiment, LANs 20 are Internet Protocol (IP) networks. However, LANs 20 may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateway devices 24. For example, LAN 20a is coupled to a private branch exchange (PBX) 50 through a gateway device 24a. PBX 50 includes a plurality of extension telephones or subscriber sets 54a and 54b to which PBX 50 directs incoming telephone calls, Gateway device 24a may be either an analog or a digital gateway device depending on the type of PBX 50 to which it is coupled.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateway devices 24b and 24c. The operation of the gateway devices 24 in communication network 10 is described in further detail below.

Central offices 62 are coupled through a long distance network 66 that allows communication between residences and businesses coupled to central offices in different areas, such as central office 62a in Dallas and central office 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees by using WAN 30 to transmit calls between LANs 20 in different areas. Internet 40 may also be used to transmit calls.

IP networks and other packet-based networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network (as well as other packet-based networks) may be referred to as Voice over Packet (VoP). IP telephony devices 22 have the capability of encapsulating a user's voice (or other media inputs) into IP packets so that the voice can be transmitted over LANs 20, WAN 30 and/or Internet 40. IP telephony devices 22 may include telephones, fax machines, computers running telephony software (such as MICROSOFT NETMEETING), gateway devices, H.323-compatible devices, or any other device capable of performing telephony functions in an IP network.

Communication network 10 includes a plurality of call managers 26 that control one or more IP telephony devices 22. A call manager 26 is an application that controls call processing, routing, telephone features and options (such as call hold, call transfer and caller ID), device configuration, and other telephony functions and parameters within communication network 10. A call manager 26 can control one or more of the IP telephony devices 22 coupled to the same LAN 20 to which it is coupled, and a call manager 26 may also control IP telephony devices 22 located elsewhere in communications network 10. For example, call manager 26a is capable of controlling telephony devices on LAN 20b. A call manager may be implemented as software executing on one or more computers coupled to communication network 10. The call manager software may be embodied in any type of computer-readable medium including, but not limited to, hard drives, diskettes, CD-ROMs, DVD-ROMs, or other optical or magnetic storage devices.

When an IP telephony device 22 is connected to a LAN 20 or elsewhere in communication network 10 (or when it otherwise comes on-line), the telephony device 22 may be assigned an IP address using Dynamic Host Control Protocol (DHCP) or another similar protocol or technique. The telephony device 22 then registers with any call manager 26 with which it can communicate using its telephone number and its IP address. Alternatively, the telephony device 22 may request that it be assigned a telephone number and/or an IP address. The term "telephone number" should be understood to include any appropriate combination of digits or characters or any other appropriate method of identifying a telephony device. The telephony device may also report its Media Access Control (MAC) address and/or its device name. The call manager 26 with which a telephony device 22 has registered creates an internal device process, described below, that is used to route signaling to the telephony device 22 from call managers 26 or other telephony devices 22.

The ability of a call manager 26 to control any IP telephony device 22 in communication network 10 allows a call processing environment in which control of devices may distributed dynamically in response to changes in communication network 10. For example, if a call manager 26 goes off-line, the telephony devices 22 controlled by that call manager 26 can connect and register with an alternative call manager 26 in communication network 10. Likewise, if a communication link between a telephony device 22 and a call manager 26 goes down, the telephony device 22 may connect and register with an alternative call manager 26 to which there is an operable communication path. Furthermore, the distributed control of telephony devices 22 also provides for network scalability and load-sharing by allowing telephony devices 22 to be controlled by any call manager 26, regardless of physical location, in order to avoid excess load on a particular call manager 26 when new telephony devices 22 come on-line or to provide load balancing between call managers 26.

FIG. 2 illustrates an exemplary call manager 26a. It should be understood that any appropriate combination of telephony devices 22 and/or gateway devices 24 in communication network 10 may be controlled by call manager 26a. In the illustrated embodiment, call manager 26a controls telephony devices 22a and 22c, which are coupled to LAN 20a, and telephony device 22h and gateway device 24c, which are coupled to LAN 20b.

Call manager 26a includes a number of internal processes that are used to manage and control communication to and from devices 22, 24. These processes include, but are not limited to a call control module 102, a digit analysis module 104, and one or more device processes 108. Call control module 102 is responsible for establishing calls between multiple IP telephony devices 22 or between one or more IP telephony devices 22 and one or more external telephony devices, such as PBX telephony devices 54 and PSTN telephony devices 68.

In the illustrated embodiment, each device 22, 24 has an associated device process 108. Signaling to and from devices 22, 24 is first passed through the associated device process 108, which acts as a signaling contact point in call manager 26a to a device 22, 24. For example, signaling sent from call control module 102 of call manager 26a or signaling sent from another call manager 26 is directed to the appropriate device process 108, which then communicates the signaling to the appropriate device 22, 24. Likewise, signaling sent from a device 22, 24 is first sent to the associated device process 108, and is then communicated to the appropriate destination. Signaling between devices 22, 24 and between call managers may be performed using any appropriate signaling method including, but not limited to, a direct signaling model or a tunneling trunk model, as described below.

When a device 22, 24 coupled to a LAN 20 or any other appropriate location in communication network 10 comes on-line, the device 22, 24 registers with a call manager 26. As described above, a device 22, 24 can register with any call manager 26 with which the device 22, 24 can communicate by sending the call manager 26 a registration request. A call control module 102, or any other appropriate component of call manager 26, receives the registration requests. Call control module 102 (or another appropriate component) generates a device process 108 for the registering device 22, 24 and assigns the device process 108 a process identification number or string (PID).

Call control module 102 communicates the registering device's telephone number and the associated device process PID to digit analysis module 104. Digit analysis module 104 associates the telephone number and the PID in a registration information table 110 or any other appropriate database. Registration information table 110 may also include any other suitable registration information associated with the registering device 22, 24, such as the device name, IP address or MAC address of the device 22, 24.

When a device 22, 24 wishes to establish communications with another device in communication network 10, the device 22, 24 typically communicates one or more digits to the call manager 26 controlling device 22, 24. The digits identify the device with which communication is requested. For example, a telephony device 22 may send a call manager 26 one or more digits indicating the telephone number of an IP telephony device 22 or a non-IP telephony device (such as a PBX device 54 or a PSTN device 68) to initiate a telephone call with the device. Alternatively, a gateway device 24 may communicate one or more digits to a call manager 26 identifying an IP telephony device 22 with which a non-IP telephony device 54, 68 desires to communicate.

Digit inputs received by a call manager 26 are communicated to digit analysis module 104. Digit analysis module 104 may receive these digits directly from a device process 108, a call control module 102 (which received the digits from a device process 108) or any other suitable process in the same or a different call manager 26. Digit analysis module 104 translates the digit input it receives into the PID of the device process 108 that is associated with the device 22, 24 designated by the received digits. Digit analysis module 104 performs this translation using a table look-up in registration information table 110 or any other suitable process of determining the PID associated with the digits. The digits may be an internal telephone number (such a four-digit extension number), in which case the PID typically identifies a device process 108 associated with a telephony device 22. Alternatively, these digits may be an external telephone number (for example, a seven or ten digit North American Numbering Plan number or a PBX extension), in which case the PID may identify a device process 108 associated with a gateway device 24 or a process associated with a plurality of gateway devices 24. Digit analysis module 104 communicates the PID to the process that requested the digit analysis.

As an example, and not by way of limitation, assume that telephony device 22a communicates a call request including a digit string to device process 108a. The digit string is a telephone number of telephony device 22h. Device process 108a receives the digit string and communicates the digits to call control module 102. Call control module 102 communicates the digits to digit analysis module 104 to determine the PID of the device process 108 associated with the digits. Digit analysis module 104 performs a table look-up or any other suitable process of determining the PID associated with the digits (the PID of device process 108c) and communicates the PID to call control module 102. Call control module 102 may then communicate with device process 108c to initiate a call or other communication between telephony devices 22a and 22h, as is described below in further detail.

In the example above, the requested communication was between two telephony devices 22a and 22h controlled by call manager 26a. However, in many cases, devices 22, 24 controlled by different call managers 26 may wish to communicate. For example, due to the distributed nature of call managers 26 and the devices 22, 24 that they control, it is quite possible that two devices 22,24 operated by a business may be controlled by two different call managers 26 located across the country from one another. Therefore, the registration information table 110 in a call manager 26 should have not only the PIDs (or other appropriate registration information) of the device processes 108 associated with the devices 22, 24 that the call manager 26 controls (local devices), but also the PIDs of device processes 108 associated with devices 22, 24 controlled by other call managers 26 (remote devices) with which communication might be desired.

As devices 22, 24 come on-line, go off-line or switch call managers 26, the registration table 110 in each call manager 26 needs to be updated. For this reason, each call manager 26 periodically communicates the telephone numbers and associated PIDs of the devices 22, 24 it controls to each of the other call managers 26. Each call manager 26 adds this information to the local device registration information in its registration information table 110.

FIG. 3 illustrates an exemplary registration information table 110 maintained by call manager 26a. Table 110 contains a list of digit strings 112 in a left column and a list of respective PIDs 114 of device processes 108 in a right column. In the illustrated embodiment, digit strings 112 include both internal four-digit telephone numbers and external telephone numbers (for example, telephone numbers associated with telephony devices 54, 68). The external telephone numbers are designated in table 110 by the notation "9@" (indicating the number nine preceding any digit string). These external telephone numbers could also include any other appropriate format (for example, external calls could be designated as "xxx-xxxx", "xxx-xxx-xxxx" or any other appropriate dialing pattern).

In the illustrated embodiment, each PID 114 includes a node number (representing a call manager 26), a process name (identifying the type of process), and an instance number. For example, the PID '1.dp.3' may indicate the third device process 108 executing in the call manager 26 having a node number of '1'. Similarly, the PID '2.dp.1' indicates the first device process 108 executing in a second call manager having a node number of '2'. Although a particular type of PID 114 is illustrated, any other method of identifying a device process 108 in a call manager 26 may be used. In addition, other appropriate processes associated with devices 22, 24 may also be identified in registration information table 110.

A PID 114 enables a call control module 102 (or another appropriate process) in one call manager 26 to directly communicate with a device process 108 in the same (local) call manager 26 or another (remote) call manager 26 in order to establish communication between two devices 22, 24. Registration information table 110 may contain the PIDs of many different types of processes executing at multiple call managers. This PID information provides a location or address at which a process may be signaled, even if that process is at a different call manager than the process or other component that is sending the signal. As will be described below, using registration information table 110, a telephone number received from a device 22, 24 may be resolved at the call manager 26 receiving the telephone number into a PID of a device process 108 (or other type of process) associated with a device 22, 24 identified by the telephone number. The device process 108 may then be directly signaled even though it may be executing at another call manager.

However, if direct signaling to a remote device process 108 is not available, PIDs 114 of remote device processes 108 may be replaced with just the node number of the remote call manager 26 executing the remote device process 108. In this case, call control module 102 (or another appropriate process) signals the remote call manager 26 with the telephone number of the device 22, 24 with which communication is desired. The call manager receiving the signaling then communicates the telephone number to its local digit analysis module 104, which determines the appropriate local PID. The local digit analysis module 104 communicates the PID to the local call control module 102, which then initiates (or attempts to initiate) the desired communication between devices 22, 24.

To keep the registration information table 110 at each call manager 26 updated, each call manager 26 may dynamically disseminate appropriate registration information associated with devices 22, 24 over which it has control. In addition, call managers 26 may monitor the status of other call managers 26 to determine whether to update or disseminate device registration information. In one embodiment, call managers 26 perform this dissemination and updating of registration information according to a set of four procedures, illustrated in FIGS. 4A-4D. These procedures provide for the updating of the information in the registration information table 110 of each call manager 26 each time a device 22, 24 or call manager 26 comes on-line or goes off-line.

FIG. 4A illustrates a first procedure 200 for updating registration information. Procedure 200 begins when device 22, 24 registers with and comes under the control of a call manager 26 at step 202. This includes a receipt of registration information from the device 22, and the creation of a device process 108 associated with the registering device 22, 24. The controlling call manager 26 adds the appropriate registration information (for example, the device's telephone number and the PID of the associated device process 108) to its registration information table 110 at step 204 and communicates a message to all other active call managers 26 providing the registration information at step 206. The other call managers 26 receive this message at step 208, and each call manager 26 updates its registration information table 110 to include the new registration information at step 210. This dissemination of information according to procedure 200, as well as the three other procedures described below, may be made directly between digit analysis modules 104 of the active call managers 26.

FIG. 4B illustrates a second procedure 220 for updating registration information. Procedure 220 begins at step 222 when a device 22, 24 fails, is disconnected from communication network 10, unregisters with its controlling call manager 26, or is otherwise no longer under the control of a previously controlling call manager 26. The call manager 26 deletes the registration information associated with the device 22, 24 from its registration information table 110 at step 224 and communicates a deletion message to all other active call managers 26 indicating that the information has been deleted at step 226. The other call managers 26 receive this message at step 228 and delete the registration information associated with the device 22, 24 from their registration information table 110 at step 230. The deletion message sent when a device 22, 24 is no longer controlled by a particular call manager 26 and the registration information sent when a device registers (becomes under control) of a particular call manager 26 may both be generalized as types of status information sent by a call manager 26 when the call manager 26 becomes aware of a change in the control status of a device 22, 24.

A controlling call manager 26 may periodically poll the devices 22, 24 that it controls by sending out a polling message to determine when a device 22, 24 has failed, been disconnected from communication network 10, or is otherwise no longer able to be controlled by the call manager 26. If call manager 26 fails to receive a response to a polling message from a device 22, 24, call manager 26 determines that the non-responding device 22, 24 is no longer under its control. Alternatively, call manager 26 may expect a regular "heartbeat" from each device 22, 24 registers with call manager 26. If a registered device 22, 24 does not send a heartbeat, call manager 26 determines that the device 22, 24 is no longer under its control.

FIG. 4C illustrates a third procedure 250 for replicating registration information. Procedure 250 begins when a new call manager 26 is connected to communication network 10 and comes on-line at step 252. When the new call manager 26 is detected, the other active call managers 26 communicate their local registration information (the information associated with the devices 22, 24 that a call manager 26 controls) to the new call manager 26 at step 254. Call managers 26 may detect the presence of a new call manager 26 in communication network 10 by periodically communicating polling messages over communication network 10 and determining whether a new call manager 26 has responded. The new call manager 26 compiles the registration information sent by the other call managers 26 to create its own registration information table 110 at step 256. As devices 22, 24 register with the new call manager 26, the new call manager 26 adds local registration information to the remote registration information received from the other call managers 26 at step 258.

The combination of the local and remote registration information may be referred to as composite registration information. This composite registration is stored in registration information table 110. The registration information table 110 of a call manager 26 may include one or more flags indicating which entries in that particular registration information table 110 comprise local registration information, so that the call manager 26 storing the registration information table 110 will know which entries to replicate to new call managers 26. Alternatively, a call manager 26 may determine which entries comprise local registration information based on the node number or PID included in the entry.

FIG. 4D illustrates a fourth procedure 270 for replicating registration information when a call manager 26 has gone off-line (for example, when it has failed, is disconnected from communication network 10, or is unable to communicate with one or more of the other active call managers 26). Procedure 270 begins with each active call manager 26 communicating polling messages to each of the other active call managers 26 at step 272. A call manager determines that a previously active call manager 26 (for example, a call manager 26 that previously responded to polling messages) has gone off-line at step 274 when the previously active call manager 26 fails to respond to the polling message. The active call manager 26 purges the registration information stored in its registration information table 110 that was previously communicated by the non-responsive call manager 26 (the non-responsive call manager's local registration information) at step 276. A similar process is performed by all other active call managers 26.

Although slow data transmission rates or other communication problems affecting the replication and updating procedures described above may cause inconsistencies between the registration information tables 110 of the active call managers 26, these inconsistencies are resolved over time without having a detrimental effect on the operation of call managers 26 and their control of devices 22, 24. As an example, assume that telephony device 22a, which is controlled by call manager 26a and has a telephone number or extension of '1000', is unable to communicate with call manager 26a due to a network failure. When call manager 26a fails to receive a polling response from telephony device 22a, call manager 26a deletes the registration information associated with telephony device 22a from its registration information table 110. Call manager 26a communicates a message to all active call managers 26 indicating that the information has been deleted according to procedure 220.

However, due to slow data transmission rates in portions of communication network 10, telephony device 22a is able to reregister with a call manager 26c as extension '1000' before the deletion message from call manager 26a reaches call manager 26c. Call manager 26c registers telephony device 22a and changes the PID that was associated with extension '1000' in its registration information table 110 from a remote PID (located at call manager 26a) to a local PID of a device process 108 that was created for telephony device 22. Call manager 26c communicates a message to all active call managers 26 providing the registration information according to procedure 200. When call manager 26c receives the deletion message from call manager 26a, call manager 26c ignores the deletion message since it no longer associates extension '1000' with a device process 108 at call manager 26a.

Alternatively, call manager 26c may not initially change the PID associated with extension '1000' when telephony device 22a registers with call manager 26c. Instead, call manager 26c may create a second entry associated with extension '1000'. The multiple entries are then resolved as described below in relation to call manager 26b.

In this example, a third call manager 26b is also active in communication network 10. Call manager 26b receives the registration message from call manager 26c before it receives the deletion message from call manager 26a. Call manager 26b adds the new registration information for extension '1000' in its registration information table accordingly. However, it does not remove the entry for extension '1000' associated with call manager 26a, since it has received conflicting information regarding the PID to be associated with extension '1000'. Typically, call manager 26b will eventually receive the deletion message from call manager 26a, and call manager 26b will then delete the extension '1000' entry associated with call manager 26a. However, if this deletion message is not received due to some type of network failure, the next time call manager 26b attempts to signal the device process 108 of call manager 26a associated with extension '1000', call manager 26a will inform call manager 26b that it no longer controls telephony device 22a. Call manager 26b then deletes the extension '1000' entry associated with call manager 26a in its registration information table 110. Therefore, the registration information tables 110 of call managers 26 eventually become consistent, and there is no disruption in performance during the interim.

Due in part to the digit analysis replication scheme described above, a dynamic, flexible, scalable and reliable IP telephony network is created in which the task of controlling a number of devices 22, 24 can be distributed seamlessly and dynamically between a number of call managers 26. A call manager 26 can control any device 22, 24 coupled to communication network 10 regardless of the respective geographic locations of the call manager 26 and the devices 22, 24. Therefore, in the event that a call manager 26 experiences communication problems, goes off-line, or reaches its device control capacity, the control of devices 22, 24 can be automatically distributed to other call managers 26, regardless of their physical location. Furthermore, the distribution of device control between call managers 26 can be dynamically changed without the intervention of a human administrator.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A first call manager coupled to a packet-based network that comprises a plurality of call managers and a plurality of devices, the first call manager comprising:
   a plurality of device processes each controlling one of the plurality of devices coupled to the packet-based network that are controlled by the first call manager;
   a digit analysis module storing composite registration information associated with the devices, the composite registration information comprising local registration information identifying which of the plurality of devices are controlled by the first call manager and remote registration information identifying which of the plurality of devices are controlled by at least a second call manager; and
   the first call manager operable to communicate status information from the digit analysis module to the second call manager in response to a change in the control status of one of the devices by the first call manager.

2. The first call manager of claim 1, wherein the digit analysis module is operable to communicate status information in response to a change in the control status of a device by communicating registration information associated with a newly registered device controlled by the first call manager.

3. The first call manager of claim 1, wherein the digit analysis module is operable to communicate status information in response to a change in the control status of a device by communicating a deletion message indicating the removal of a device from the control of the first call manager.

4. The first call manager of claim 3, further operable to determine that a device has been removed from the control of the first call manager in response to a failure by the first call manager to receive a response from the device to a polling message from the first call manager.

5. The first call manager of claim 1, wherein the digit analysis module is operable to communicate status information directly to a digit analysis module of the second call manager.

6. The first call manager of claim 1, further operable to:
determine that a second call manager has gone off-line; and
delete registration information associated with devices controlled by the second call manager from the composite registration information stored in the digit analysis module of the first call manager.

7. The first call manager of claim 6, wherein the first call manager determines that the second call manager has gone off-line when the first call manager fails to receive a response to a polling message sent to the second call manager, the second call manager having previously responded to a polling message from the first call manager.

8. The first call manager of claim 1, further operable to:
determine that a second call manager has come on-line; and
communicate local registration information associated with devices controlled by the first call manager to the second call manager.

9. The first call manager of claim 8, wherein the first call manager determines that the second call manager has come on-line when the first call manager receives a communication from the second call manager indicating that the second call manager is on-line.

10. First call manager software embodied in a computer-readable medium and operable to perform the following steps when executed by a computer:
control a plurality of devices coupled to a packet-based network, each of the plurality of devices controlled using an associated device process;
store composite registration information comprising local registration information identifying which of the plurality of devices are controlled by the first call manager and remote registration information identifying which of the plurality of devices are controlled by at least a second call manager; and
communicate status information to second call manager software in response to a change in the control status of a device by the first call manager.

11. The first call manager software of claim 10, further operable to communicate status information in response to a change in the control status of a device by communicating registration information associated with a newly registered device controlled by the first call manager software.

12. The first call manager software of claim 10, further operable to communicate status information in response to a change in the control status of a device by communicating a deletion message indicating the removal of a device from the control of the first call manager software.

13. The call manager software of claim 12, further operable to determine that a device has been removed from the control of the first call manager software in response to a failure to receive a response from the device to a polling message from the first call manager.

14. The first call manager software of claim 10, further operable to:
store registration information associated with devices controlled by the second call manager software;
determine that the second call manager software has gone off-line; and
delete registration information associated with the devices controlled by the second call manager software.

15. The first call manager software of claim 14, further operable to determine that the second call manager has gone off-line in response to the first call manager software failing to receive a response to a polling message sent to the second call manager software.

16. The first call manager software of claim 10, further operable to:
determine that the second call manager software has come on-line; and
communicate local registration information associated with devices controlled by the first call manager software to the second call manager software.

17. The first call manager software of claim 16, further operable to determine that the second call manager has come on-line when the first call manager software receives a communication from the second call manager software indicating that the second call manager software is on-line.

18. A first call manager coupled to a packet-based network comprising a plurality of call managers, the first call manager comprising:
means for controlling a plurality of devices coupled to the packet-based network;
means for storing composite registration information associated with the devices, the composite registration information comprising local registration information identifying which of the plurality of devices are controlled by the first call manager and remote registration information identifying which of the plurality of devices are controlled by at least a second call manager; and
means for communicating status information to the second call manager in response to a change in the control status of one of the devices by the first call manager.

19. The first call manager of claim 18, further comprising means for communicating registration information associated with a newly registered device controlled by the first call manager.

20. The first call manager of claim 18, further comprising means for communicating a deletion message indicating the removal of a device from the control of the first call manager.

21. The first call manager of claim 20, further comprising means for determining that a device has been removed from the control of the first call manager in response to a failure by the first call manager to receive a response from the device to a polling message from the first call manager.

22. The first call manager of claim 18, further comprising:
means for determining that a second call manager has gone off-line; and
means for deleting registration information associated with devices controlled by the second call manager from the composite registration information stored by the first call manager.

23. The first call manager of claim 22, further comprising means for determining that the second call manager has gone off-line when the first call manager fails to receive a response to a polling message sent to the second call manager, the second call manager having previously responded to a polling message from the first call manager.

24. The first call manager of claim 18, further comprising:
means for determining that a second call manager has come on-line; and
means for communicating local registration information associated with devices controlled by the first call manager to the second call manager.

25. The first call manager of claim 24, further comprising means for determining that the second call manager has come on-line when the first call manager receives a communication from the second call manager indicating that the second call manager is on-line.

* * * * *